United States Patent [19]
de Hilster et al.

[11] Patent Number: 5,999,939
[45] Date of Patent: Dec. 7, 1999

[54] SYSTEM AND METHOD FOR DISPLAYING AND ENTERING INTERACTIVELY MODIFIED STREAM DATA INTO A STRUCTURED FORM

[75] Inventors: David Scott de Hilster, Long Beach; Alan George Porter, Huntington Beach; John Reese, Los Angeles, all of Calif.

[73] Assignee: Interactive Search, Inc., Los Angeles, Calif.

[21] Appl. No.: 09/019,948

[22] Filed: Feb. 6, 1998

Related U.S. Application Data

[60] Provisional application No. 60/068,404, Dec. 21, 1997.

[51] Int. Cl.$^6$ ..................................................... G06F 17/30
[52] U.S. Cl. ............................ 707/102; 707/104; 705/28
[58] Field of Search .................................... 707/102, 104; 705/28

[56] References Cited

U.S. PATENT DOCUMENTS

| | | | |
|---|---|---|---|
| 5,164,899 | 11/1992 | Sobotka et al. | 705/9 |
| 5,197,004 | 3/1993 | Sobotka et al. | 705/8 |
| 5,721,827 | 2/1998 | Logan et al. | 709/217 |
| 5,740,425 | 4/1998 | Povilus | 707/100 |
| 5,806,057 | 9/1957 | Gormley et al. | 707/1 |
| 5,809,248 | 9/1998 | Vidovic | 709/219 |
| 5,832,496 | 11/1998 | Anand et al. | 707/102 |
| 5,855,007 | 12/1998 | Jovicic et al. | 705/14 |
| 5,907,837 | 5/1999 | Ferrel et al. | 707/3 |

*Primary Examiner*—Wayne Amsbury
*Attorney, Agent, or Firm*—Freilich, Hornbaker & Rosen

[57] ABSTRACT

A system and method for facilitating the accurate entry of information into a highly structured database by initially extracting information from a plurality of nonuniformly formatted source data streams, e.g., documents/files, and subsequent interactions with users before storing the accepted and/or modified information into the database. Embodiments of the present invention provide an interactive path for each user (e.g., the author of the source document/file) to interactively modify the extracted data, e.g., according to the source document/file. Preferably, this interactive path is provided via the Internet and the extracted information can be modified by editing and/or selectively copying portions of the source documents/files to supplement and/or modify the extracted information.

20 Claims, 10 Drawing Sheets

EXPERIENCE: ⟋ 26

⟋ 24a ⟋ 24b ⟋ 24c ⟋ 24d
11/96 - 7/97 Relocation Assistance Coordinator
 Tokyo Central Agency (TGA Inc.) Tokyo, Japan
Worked in a completely bilingual environment, involved in all aspects of Expatriate relocation. Conducted various orientations focusing particularly on life in Tokyo assistance in immigration and other official procedures, house hunting and school arrangements. Constantly required to use various skills in interpretation, translation, negotiation and cultural awareness.

jobEngine          Post Resume
Help?

This page is for posting a new resume. Click here to Change or Remove a previously posted resume.

Instructions:

There are 3 steps to post your resume:

- Paste in your resume.
- Answer a few questions.
- Review our work to ensure that the information in your resume is correct. Then enroll.

And only a few rules:         68

- Items labelled in Red are Required.
- Items labelled in Black are Optional, but we strrongly suggest that you take a few minutes to answer the questions. Your answers provide information, not typically found in a resume, that employers want to know before they contact you.

Don't worry -- nothing will be saved in the database without your review and approval.

STEP ONE -- PASTE IN YOUR RESUME

Copy your resume from a text file on your computer and paste into the text block below.

Be sure your contact information (name, address, phone number(s) and email address) appears only at the top of the resume, and that nothing in the body of your resume (like your current job description) identifies you. This protects your privacy. This step is Required.

Resume:         70

```
Arthur Smith
1234 Main Street
Sausalito, California 94965
Tel: 415-555-5432    Fax: 415-555-5543
E-mail: asmith@isp.com

EXPERIENCE:

11/96 - 7/97 Relocation Assistance Coordinator
Tokyo Central Agency (TGA Inc.) Tokyo, Japan
```

[Ready for Step 2]    [Clear Form]

*Fig. 6A.* jobEngine

Post Resume
Help?

STEP TWO -- ANSWER A FEW QUESTIONS

There's some additional information, not typically in your resume, that is very helpful to employers. Most of these questions are optional. However, you should try to answer as many as possible. It will only take a few minutes... promise.

/~72

Job Goals

Functional Specialties
```
GENERAL MANAGEMENT
  Senior Management (CEO Pres, COO, GM)
  Branch & Regional Management
INFORMATION TECHNOLOGY MANAGEMENT
```
~82a Type of Position  [Full Time ▼] ~82b Expected Compensation  [open ▼] ~82c Travel  [Moderate (25%-50%) ▼] ~82d Relocation  [Yes - I can relocate to: ▼]  Areas [most anywhere] ~82f
~82e

About You

Citizenship  [U.S. Citizen ▼] ~82g

Current Clearances  [No ▼] ~82h

Enrollment  ~82i

Type
- ● Open - Your full resume, including contact information, will be available to employers.
- ○ Confidential - Your full resume, except your contact information, will be available to employers. Those interested in contacting you can do so via email forwarded to you confidentially.
- ○ Private - No employer can see your resume. It is retained in jobEngine's Resume Center as a convenience to you when applying to jobs.

[ Ready for Step 3! ]  [ Start Over ]

---

Comments, questions or suggestions? Please email us at support@jobEngine.com

── A ZDNet and I-Search Site ──

 Copyright (c) 1997 jointly by Ziff-Davis (ZDNet) and Interactive Search (I-Search). All rights reserved. jobEngine and "Matchmakers for IT Professionals" are joint service marks of Ziff-Davis and 

*Fig. 6B.*

JobEngine

Post Resume

STEP 3 -- REVIEW INFORMATION AND ENROLL

We know you hate to enter again what you have already put into your resume. So, we've tried first to fin information we need. Please review the information carefully and correct errors. A copy of your resum included for copying and pasting as needed. This is an important step. Remember -- items labeled in Re Required.

Be sure to scroll through all the data in this window, make all needed corrections, select a Resu Access Code and password, and then Post your resume.

Contact Information (confidential) — 92

- Name: Arthur | Smith    (94a, 94b, 94c, 94d)
- Address: 1234 Main Street  — 94e
-  (blank)  — 94f
- City, State Zip: Sausalito, California  94965    (94i, 94g, 94h)
- Country: USA
- Phone: Home 415-555-5432 | Work [ ] | Fax 415-555-55
- Email: asmith@isp.com
- Web Page: [ ]

Experience

Your three most recent positions. The order of jobs is not important. For each job entered, information is in each of the four columns with red labels.

| Start Date | End Date | Company | Title |
|---|---|---|---|
| 11/96 | 7/97 | TGA Inc. | Relocation Assistan |
| 3/95 | 10/96 | NCR English Language Inst | English Teacher |
| 8/94 | 2/95 | Los Angeles | Sales Associate |

Year First Employed: 5/93    —32    —94n

Education

Your three most recent degrees. For each degree entered, information is required in each of the two colu red labels. Information in the other columns is helpful.

| Year | Degree | School | Major |
|---|---|---|---|
| March, 1 | Bachelor of Ar | University of California | Speech Communications |
|  |  |  |  |
|  |  |  |  |

*Fig. 6C.* (PART 1 OF 3)

Job Goals

Functional Specialties

Senior Management (CEO Pres, COO, GM)
Branch & Regional Management
INFORMATION TECHNOLOGY MANAGEMENT

Type of Position Full Time

Expected Compensation open

Travel Moderate (25%-50%)

Relocation Yes - I can relocate to:  Areas most anywhere

About You

Citizenship U.S. Citizen

Current Clearances No

Please Help Us

We are curious about how you learned about jobEngine. Please help us by selecting one of the choices

Access Keys

Select an access code and password for future access to your resume.

Resume Access Code arthur

Password

Password (again)

Posting

Neither Ziff-Davis nor I-Search is responsible for the verification of data provided and shall not be liable for any errors, factual, transcript otherwise, contained in the information posted. Further, we assume no obligation with respect to the compliance of the information or a process with applicable governmental laws, rules and regulations of any kind regarding employment practices. With respect to confide Ziff-Davis and I-Search will use reasonable measures to delete the applicant's identity, but shall not be responsible for unintentional dis software malfunctions or exposures of applicant through descriptive information contained in the body of the resume.

I accept the agreement, post my resume...

Your resume text for cutting and pasting information a
Back to Form

Processed by I-Search: 151-9000-5279

12'

Arthur Smith
1234 Main Street
Sausalito, California 94365
Tel: 415-555-5432    Fax: 415-555-5543
E-mail: asmith@isp.com

EXPERIENCE:

*Fig. 6C. (PART 2 OF 3)*

11/96 - 7/97 Relocation Assistance Coordinator
Tokyo Central Agency (TGA Inc.) Tokyo, Japan
Worked in a completely bilingual environment, involved in all aspects of Expa
Conducted various orientations focusing particularly on life in Tokyo assista
other official procedures, house hunting and school arrangements. Constantly
skills in interpretation, translation, negotiation and cultural awareness.

3/95 - 10/96 English Teacher
NCR English Language Institute, Tokyo, Japan
Nova Inter cultural Institute, Tokyo, Japan
Experienced in all aspects of teaching English as a foreign language, includi
T.O.E.F.L. Actively participated in recruitment of new students, student lev
progress analysis. Voted Teacher of the Year by students and upper managemen 8/94 - 2/95 Sales Associate
Nordstroms Los Angeles, CA
Consistently ranked as highest in customer sales and satisfaction in a compet
environment. Sharpened communicational skills and refined fashion sense gave
privilege of an honest and bright salesperson.

5/93 - 6/94 Resort Hotel Supervisor
Pacific Islands Club, Guam, U. S. A.
Thrived in a resort where the primary focus was to initiate guest interaction
department of sports, entertainment and activities. Assumed direct responsib
sports complex, training the constant influx of new employees, inventory and
introduction of inventive and efficient motivational techniques) and complete

EDUCATION:

Bachelor of Arts - Speech Communications
University of California at Santa Barbara
Graduation:    March, 1993

Major Courses of Study & Interest
Interpersonal Relations, Creative Writing, Psychology, Sociology CERTIFICATES: National Japanese Proficiency Exam - Level 2
  INTERESTS: Travel, Japanese, Scuba Diving, Tennis

{PGCNT}
{PAGE}

Comments, questions or suggestions? Please email us at support@jobEngine.com

——— A ZDNet and I-Search Site ———

Copyright (c) 1997 jointly by Ziff-Davis (ZDNet) and Interactive Search (I-Search). All rights reserved.
jobEngine and "Matchmakers for IT Professionals" are joint service marks of Ziff-Davis and
Interactive Search

Arthur Smith

1234 Main Street
Sausalito, California 94965
Tel: 415-555-5432   Fax: 415-555-5543
E-mail: asmith@isp.com

EXPERIENCE:

*11/96 - 7/97 Relocation Assistance Coordinator*
>Tokyo Central Agency (TGA Inc.) Tokyo, Japan
>Worked in a completely bilingual environment, involved in all aspects of Expatriate relocation. Conducted various orientations focusing particularly on life in Tokyo assistance in immigration and other official procedures, house hunting and school arrangements. Constantly required to use various skills in interpretation, translation, negotiation and cultural awareness.

*3/95 - 10/96 English Teacher*
>NCR English Language Institute, Tokyo, Japan
>Nova Inter cultural Institute, Tokyo, Japan
>Experienced in all aspects of teaching English as a foreign language, including Phonics, and T.O.E.F.L. Actively participated in recruitment of new students, student level assessment and progress analysis. Voted Teacher of the Year by students and upper management.

*8/94 - 2/95 Sales Associate*
>Nordstroms, Los Angeles, CA
>Consistently ranked as highest in customer sales and satisfaction in a competitive retail environment. Sharpened communicational skills and refined fashion sense gave customers the privilege of an honest and bright salesperson.

*5/93 - 6/94 Resort Hotel Supervisor*
>Pacific Islands Club, Guam, U.S.A.
>Thrived in a resort where the primary focus was to initiate guest interaction in the unique department of sports, entertainment and activities. Assumed direct responsibility for managing the sports complex, training the constant influx of new employees, inventory and ordering of supplies, introduction of inventive and efficient motivational techniques) and complete area maintenance.

EDUCATION:

>Bachelor of Arts - Speech Communications
>University of California at Santa Barbara
>Graduation: March, 1993

>Major Courses of Study & Interest
>Interpersonal Relations, Creative Writing, Psychology, Sociology CERTIFICATES: National Japanese Proficiency Exam - Level 2

INTERESTS: Travel, Japanese, Scuba Diving, Tennis

*Fig. 7.*

SYSTEM AND METHOD FOR DISPLAYING AND ENTERING INTERACTIVELY MODIFIED STREAM DATA INTO A STRUCTURED FORM

This application claims the benefit of U.S. Provisional Application No. 60/068,404 filed Dec. 21, 1997.

BACKGROUND OF THE INVENTION

The present invention relates to data processing systems for entering information into and accessing information from large structured databases and in particular to those systems which allow multiple independent users to enter information from nonuniformly formatted documents/files and to interact with the system to assure the accuracy of the database entries.

The use of databases for storing data records which can be readily searched is well known. A typical application of large structured databases would be a system for matching jobs and applicants. When used in conjunction with a search engine, a program that can search for matches between inquiry data and data stored within the database, such a system significantly reduces the manual efforts required to match the needs of employers (job providers) and applicants (job seekers). In order to enter applicant data into the database, source documents/files (typically, nonuniformly formatted resume) can be used. Since the format of text data contained within a resume is typically not standardized, text data extraction software is used to retrieve data for entry into the database. Typical of such data extraction software is that described in U.S. Pat. Nos. 5,164,899 and 5,197,004.

SUMMARY OF THE INVENTION

The present invention is directed to a system for facilitating the accurate transfer of information from a source data stream, e.g., a document/file, to a highly structured database and more particularly to such systems capable of accepting nonuniformly formatted documents, e.g., text documents such as resumes, from a plurality of users via a remote communication interface, e.g., the Internet, and for extracting information therefrom via a procedure which includes user participation to assure the transfer of appropriate entries into the database.

Embodiments of the present invention provide an interactive path for a user (typically, the author of the source document/file) to interactively modify the extracted information. In a preferred embodiment, this interactive path is provided via the Internet and the extracted information can be altered by editing and/or selectively copying portions of the source document/file to supplement and/or modify the extracted information.

A preferred system for facilitating the accurate transfer of information from each of a plurality of nonuniformly formatted source data streams into a structured database comprises (1) means for supplying digital data representing each of a plurality of source data streams from a plurality of users, each source data stream containing data corresponding to multiple discernible source data strings, (2) data extraction means for extracting selected ones of the source data strings and generating related target data strings, (3) means for displaying a structured form comprised of multiple fields, each field capable of accommodating a data string and wherein one or more of the fields have the target data strings inserted within, (4) means for enabling each user to modify the target strings inserted within the displayed form corresponding to the source data stream originating from the user before accepting the form, and (5) means for storing data corresponding to the data strings from the form fields into the database.

In a further aspect of the present invention, the providing means uses a remote communication interface, preferably using the Internet, to supply the source document/file to the data extraction means and, subsequently, to return the form having target data strings within its fields.

The novel features of the invention are set forth with particularity in the appended claims. The invention will be best understood from the following description when read in conjunction with the accompanying drawings.

BRIEF DESCRIPTION OF THE DRAWINGS

FIG. 2 is a portion of the exemplary resume of FIG. 7, showing the extraction of source text strings based on the syntax of surrounding text;

FIG. 3 is a diagram of the structure of an exemplary database comprised of a plurality of applicant data records;

FIGS. 6A–6C show exemplary forms for providing resume and/or supplementary data to the database service provider of FIG. 1; and FIG. 7 shows an exemplary resume used in conjunction with the forms of FIGS. 6A–6C.

DESCRIPTION OF THE PREFERRED EMBODIMENTS

The present invention is directed to a system for facilitating the accurate transfer of information from a source data stream, e.g., a document/file, to a highly structured database and more particularly to such systems capable of accepting nonuniformly formatted documents, e.g., text documents such as resumes, from a plurality of users via a remote communication interface, e.g., the Internet, and for extracting information therefrom via a procedure which includes user participation to assure the transfer of appropriate entries into the database.

Embodiments of the present invention provide an interactive path for a user (typically, the author of the source document/file) to interactively modify the extracted information, e.g., according to the source document/file. In a preferred embodiment, this interactive path is provided via the Internet and the extracted information can be altered by editing and/or selectively copying portions of the source document/file to supplement and/or modify the extracted information.

Figure 1:
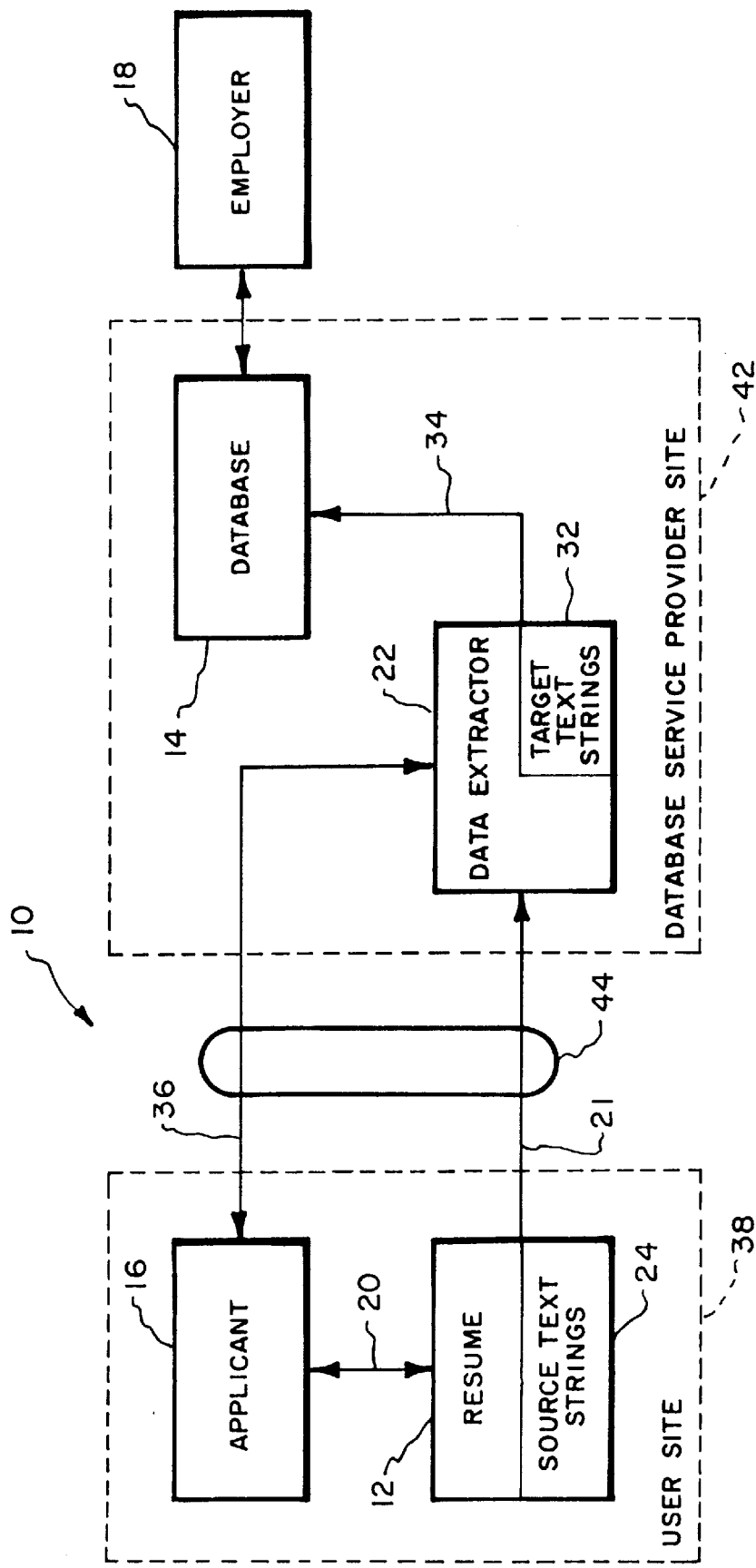
FIG. 1 comprises a simplified block diagram of a system for entering resume data into a database and interactively modifying and/or supplementing such entered data.

FIG. 1 comprises a simplified block diagram of a system 10 for entering data from a source data stream 12, e.g., a text document/file such as a resume, into a database 14 and interactively modifying and/or supplementing such entered data. In an exemplary job search environment, the interactive system 10 provides an improved system and method for accurately transferring information from resume source document/file 12, hereinafter referred to as resumes and preferably independently generated by a plurality of applicants 16, to the database 14 where it is accessible (preferably via a search engine as described further below) to one or more employers 18. Resumes are preferably used as the source documents/files 12 in this environment since resumes are a well-accepted tool for providing information from an applicant to an employer and, as such, they typically already exist.

As shown in FIG. 1, the resume 12 is typically generated via path 20 using a word processor (not shown). Interactions between the applicant 16 and resume 12 typically continue via the word processor until a satisfactory resume 12 is generated and stored as corresponding digital data. However, resumes are generally nonstructured or loosely structured (and nonuniformly formatted between users) text documents that are only intended to be human readable e.g., by the employer 18 and the applicant 16, and are typically not directly useable in the highly structured database 14. Consequently, the resume 12 is supplied via path 21 to a data extractor 22, preferably implemented as text data extraction software (e.g., the DEFT software developed by TRW as part of their InfoWeb™ system), to selectively convert information from the format of the unstructured (or loosely structured) resume 12 to the format of the highly structured database 14. Essentially as shown in FIG. 2 (a portion of the exemplary resume of FIG. 7), the data extractor 22 isolates one or more discernible source data strings, e.g., text data strings 24, within the resume 12 and, according to the content of the source data strings, e.g., 24a–24z, and using the syntax of surrounding keyword data, e.g., text strings 26, determines a correlation between source text strings 24 and data fields 28 that are to be entered into the database 14. For example, the keyword text string 26 ("EXPERIENCE") identifies the following source text strings 24 as being related to the applicant's job experience due to the syntax of the surrounding text, e.g., the keyword "experience", the existence of dates, the identification of a company (Inc.), etc.

As shown in FIG. 3, an exemplary applicant database 14 is comprised of a plurality of fixed length records 30, each corresponding to a different one of a plurality of applicants 16. Each record 30 is comprised of a plurality of data fields 28 having predefined formats and lengths, corresponding to searchable pieces of information.

Table I shows an exemplary partial list of definitions of the information stored in the data fields 28 of the database 14 of FIG. 3.

TABLE I

| Data Field | Definition |
| --- | --- |
| . | . |
| . | . |
| . | . |
| 28j | Most recent job start date |
| 28k | Most recent job end date |
| 28l | Most recent job company |
| 28m | Most recent job title |
| 28n | Next job start date |
| 28o | Next job end date |
| 28p | Next job company |
| 28q | Next job title |
| . | |
| . | |
| . | |

First, the data extractor 22 extracts source data strings, e.g., text strings 24a–2d, from the resume 12. Optionally, the text format of one or more of the source text strings 24 are then altered by the data extractor 22 to generate target data strings, e.g., text strings 32, of a standardized format. For example, a date text string could be standardized (e.g, March 12, 1993 could be changed to 3/12/93). Otherwise, the stored target text string 32 is essentially identical to the source text string 24. As described further below, each target text string 32 preferably directly corresponds to the data fields in the database 14 (e.g., the target string 32 corresponding to source text string 24a corresponds to 28j) and thus, following the modification/acceptance process described below, target text strings 32 are stored via path 34 into the database 14 (following any conversions required by the format of the database 14 and its fields 28).

However, due to lack of structure of the resume 12, the data extractor 22 (also referred to as a natural language processor) is susceptible to making an incomplete or erroneous correlations. Accordingly, the present invention provides an interactive path 36 that enables the applicant 16, generally the individual most acquainted with the contents of the resume 12, to modify the target text strings 32 to best correspond to the resume 12 and, thus, enhance the accuracy of the data stored in the database 14.

Figure 4:
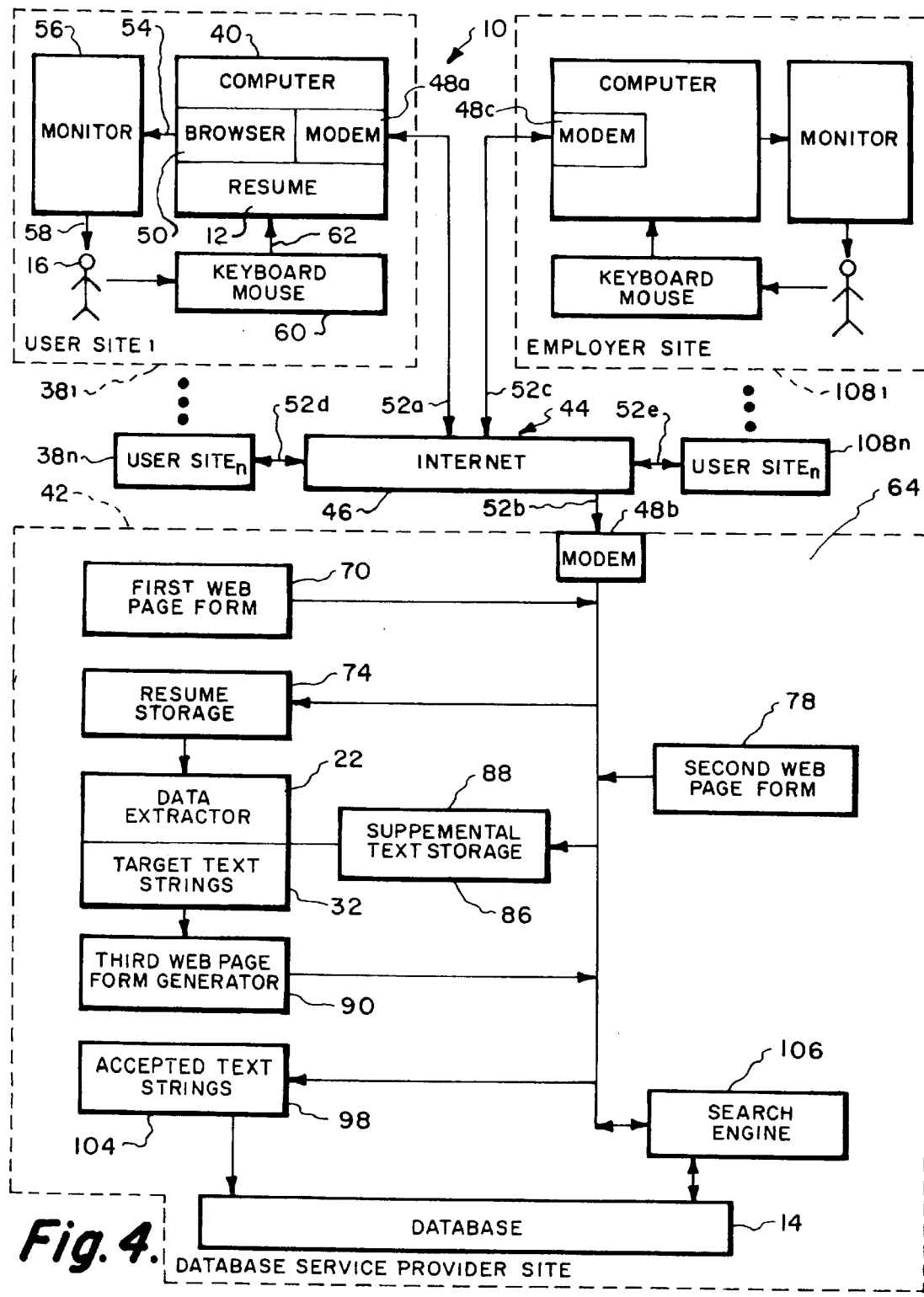
FIG. 4 comprises an expanded block diagram of the flow of the data entry system of FIG. 1.

FIG. 4 is an expanded block diagram of the system 10 of FIG. 1 showing the data flow which enables each user (i.e., applicant 16 in this exemplary environment) to interact with the information extracted by the data extractor 22 and thus assure the accurate transfer of information from the resume 12 into the structured database 14. The interactive system 10 is preferably comprised of one or more user sites 38 (including a computer 40 operated by the applicant 16) and a database service provider site 42 (generally an automated service) coupled to each other via a remote communication interface 44. In the following discussion, the remote communication interface comprises the Internet 46, the associated hardware and/or software at the user 38 and database service provider 42 sites, typically comprising a modem 48 and a web (Internet) browser 50, and the associated interconnections 52 between (typically phone lines and Internet Service Providers (ISPs)). However, other communication interfaces, e.g., a local area network (LAN) or a direct modem to modem or serial port to serial port connections, are also considered to be alternative remote communication interfaces.

Preferably, each user site 38 is comprised of the computer 40, e.g., a personal computer, having a display control output 54 that drives a display monitor 56 to generate a displayed output 58 and a data entry device, e.g., a keyboard/mouse 60, that directs operation of the computer 40 via control path 62. In contrast, while the database service provider site 42 may typically also include a monitor and a keyboard/mouse, it only requires a computer 64 that interfaces to the Internet 46.

Figure 5:
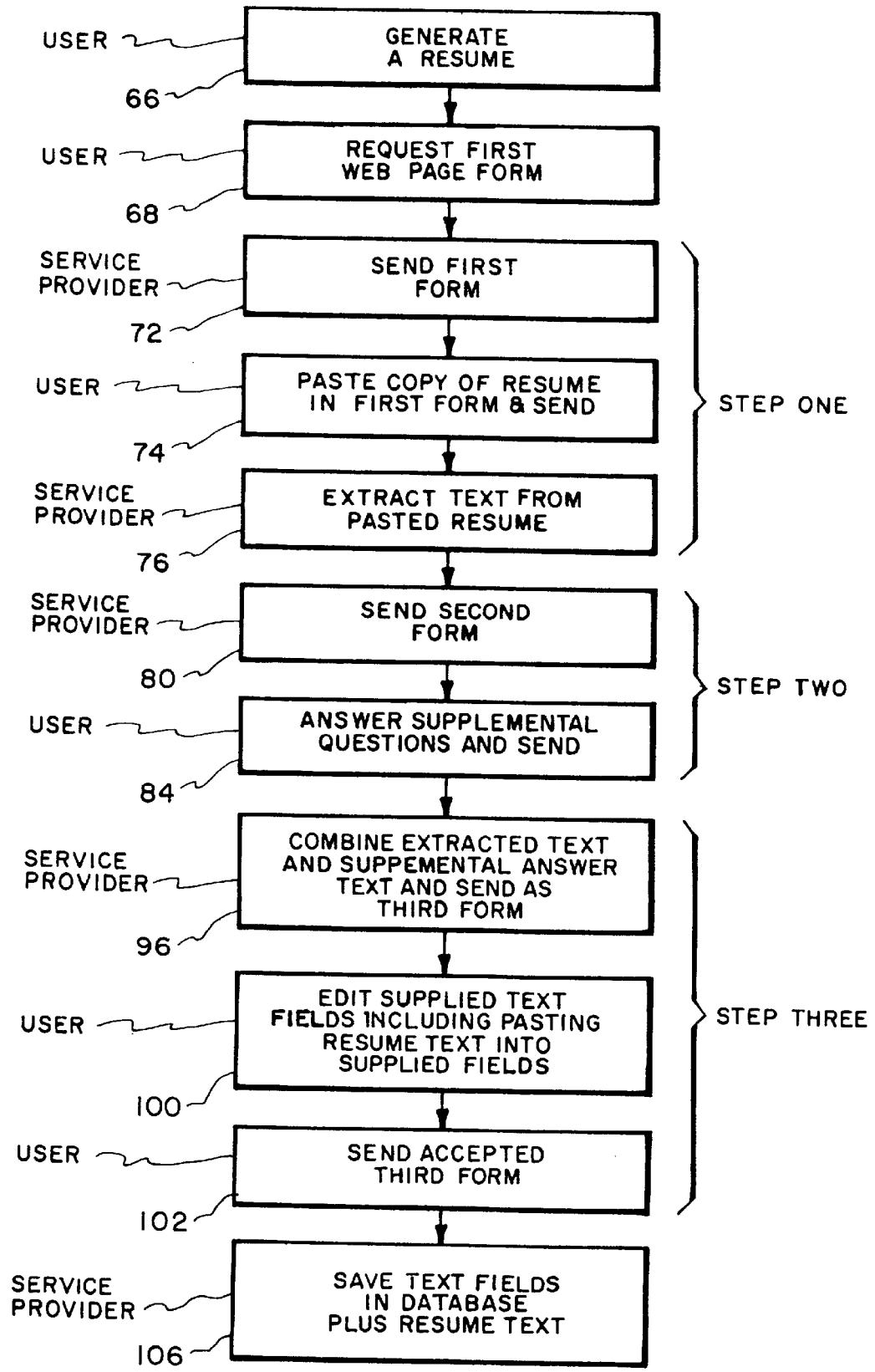
FIG. 5 comprises a simplified flow chart of the data entry flow of FIG. 4.

Initially, the user 16 at user site 38 generates the source document/file, i.e., resume 12, at step 66 of FIG. 5. As previously discussed, this generation is interactive and proceeds until user 16 is satisfied with the results. However, the resulting resume 12 is generally unstructured relative to the highly structured form of the database 14.

As a next step, the user 16 requests a first web page form (step 68) via the Internet 46 to begin the process of interactively transferring the resume 12 to the database 14. The first web page form 68 (see FIG. 6A) is stored (see block 70) within computer 64 at the database service provider site 42 and is responsively provided back (see step 72) to the user site 38 via the Internet 46 (commencing STEP ONE) and displayed by the web browser 50 on the monitor 56. The user 16 then preferably provides the existing resume 12 back to the database service provider site 42 via a pasting operation used in conjunction with the web browser 50. In an exemplary Windows 95 environment, the user 16 launches the word processor, e.g., Microsoft Word, that had been used to generate the resume 12. Preferably, the user 16 then selects the entire resume document and copies it to the clipboard. Next, the user 16 pastes the resume 12 from the clipboard into a source data input field 70 of the first web page form 68 using the web browser 50, e.g., Microsoft Internet Explorer. Typically, this pasting removes any word processor formatting information and results in digital data (preferably formatted as ASCII text) representing the resume 12 being stored in the web browser 50. (Alternatively, the word processor formatting information can be extracted by the data extractor 22.) The web browser 50 is then used to send (see step 74) the first web page form 68 (now containing the resume 12) to the database service provider site 42 where the resume 12 is stored in resume storage 74. The data extractor 22 then extracts one or more source text strings 24 according to syntactical rules to establish a correspondence between the source text strings 24 (preferably saved as intermediary target text strings 32) and fields 28 of the database 14.

Next, STEP TWO of the process commences by the computer 64 at the database service provider site 42 sending a second web page form 78 (see FIG. 6B) at step 80 which is displayed via the web browser 50 on the monitor 56 at the user site 38. In this example, the second web page form 78 is a supplemental inquiry form, that asks the user 16 one or more supplemental questions. In response, the user 16 fills in supplemental fields 82, e.g., by a pull-down field, free text entry, a radio selection, etc. This filled-in form is sent back to the database service provider 42 in step 84 where supplemental text strings 86 are stored in supplemental text storage 88.

STEP THREE of the process commences by the third web page form generator 90 at the database service provider site 42 generating a third web page form 92 (see FIG. 6C), a structured form having multiple fields 94 each field being capable of accommodating a text string within. Specifically, target text strings 32 (corresponding to source text strings 24) are inserted within fields 94 according to the syntax of the source document/file 12 and the definition (e.g., name, address, city, etc.) of each field 94. Additionally, the supplemental text strings 86 are inserted within the associated fields 94 of form 92. Preferably, the stored resume 12' from resume storage 74 is also added to the third web page form 92. Finally, the third web page form 92 is sent back in step 96 to the user site 38 where it is displayed by the web browser 50 on monitor 56.

The user 16 can now use the view the displayed form 92 to determine its accuracy. If the displayed data, including target text strings 32 and supplemental text strings 86, are accurate the user 16 sends back form 92 to the database service provider site 42 where the accepted text strings are extracted in block 98 and stored in database 14. However, as previously discussed, the displayed data is not always accurate. Accordingly, the user 16 can edit data supplied in the third web page form 92 (preferably including using the supplied resume 12) to cause the fields 94 of form 92 to more accurately represent the applicant's resume information. Using features of the web browser 50, the user 16 can in step 100 edit fields 94 and/or paste information from resume 12' (now part of form 92) to modify the data fields 94. The user in step 102 then sends the modified form 92 back to the database service provider site 42 where accepted text strings 104 from fields 94 are stored in the database 14 in step 98.

As an example of this modification process, it is noted that field 94n corresponding to the third "Company" under "Experience" has been filled in with the target text string 32 "Los Angeles". This is inaccurate since the data extractor 22 has apparently missed the company name, i.e., Nordstroms, and instead extracted the city name as the target text string 32. Therefore, the user/applicant 16 can identify this inaccuracy and either (1) edit the field 94n by typing in the correct entry or (2) select the source text string 24' from the copy 12' of resume 12 included on the third web page form and paste the proper text (Nordstroms) into field 94n. Accordingly, the user/applicant 16 has been given the opportunity to verify and correct the data before entering it into the database 14, thus assuring the accurate transfer of information into the database 14.

Once the information has been stored in the database 14, a search engine 106, preferably a software program that executes on the computer 64 at the database service provider site 42, can be used to match inquiries, e.g., from one or more employer sites 108 (preferably via the remote communication interface 44) to look for applicants 16 with specific attributes. For example, since the highly structured database 14 contains fields 28 corresponding to the schools attended by each applicant 16, the search engine 106 can, in response to a request from the employer site 108, search for applicants 16 who graduated from specific schools or any other criteria stored in the fields 28 of the database 14.

Although the present invention has been described in detail with reference only to the presently-preferred embodiments, those of ordinary skill in the art will appreciate that various modifications can be made without departing from the invention. For example, while a job search environment has been primarily described, the present invention can be useful in other environments where the source document is essentially unstructured relative to a highly structured database. Accordingly, the invention is defined by the following claims.

I claim:

1. A method for facilitating the accurate transfer of information from each of a plurality of nonuniformly formatted source data streams into a structured database, said method comprising the steps of:

supplying digital data representing each of a plurality of source data streams from a plurality of users, each said source data stream containing data corresponding to multiple discernible source data strings;

processing said digital data for extracting selected ones of said source data strings and generating related target data strings;

displaying a structured form comprised of multiple fields, each field being capable of accommodating a data string and wherein one or more of said fields have said target data strings inserted within;

enabling each user to modify and/or accept said target data strings inserted within said displayed form corresponding to said source data stream originating from said user; and storing data corresponding to said data strings from said form fields into a database.

2. The method of claim 1 wherein said supplying and displaying steps use a remote communication interface.

3. The method of claim 2 wherein said remote communication interface uses the Internet.

4. The method of claim 1 wherein said displaying step additionally includes displaying said source data stream and said enabling step includes enabling said user to copy selected portions of said source data stream into selected fields of said form.

5. The method of claim 1 wherein one or more of said target strings are essentially equivalent to said extracted source data strings.

6. The method of claim 1 additionally comprising the step of:

supplying one or more supplemental data strings in response to a supplemental inquiry form; and wherein said displayed structured form additionally displays fields having said supplemental data strings inserted within.

7. A system for facilitating the accurate transfer of information from each of a plurality of nonuniformly formatted source data streams into a structured database, said system comprising:

means for supplying digital data representing each of a plurality of source data streams from a plurality of users, each said source data stream containing data corresponding to multiple discernible source data strings;

data extraction means for extracting selected ones of said source data strings and generating related target data strings;

means for displaying a structured form comprised of multiple fields, each field capable of accommodating a data string and wherein one or more of said fields have said target data strings inserted within;

means for enabling each user to modify said target data strings inserted within said displayed form corresponding to said source data stream originating from said user before accepting said form; and means for storing data corresponding to said data strings from said form fields into said database.

8. The system of claim 7 wherein said means for supplying said digital data to said data extraction means comprises each said user submitting said digital data via a remote communication interface.

9. The system of claim 8 wherein said remote communication interface uses the Internet.

10. The system of claim 7 wherein said data extraction means additionally comprises means for returning said form via a remote communication interface.

11. The system of claim 10 wherein said remote communication interface uses the Internet.

12. The system of claim 7 wherein said means for enabling includes enabling each said user to copy selected portions of said source data stream into selected fields of said form.

13. The system of claim 7 wherein one or more of said target strings are essentially equivalent to said extracted source data strings.

14. The system of claim 7 additionally comprising:

means for supplying one or more supplemental data strings in response to a supplemental inquiry form; and wherein said displayed structured form additionally displays fields having said supplemental data strings inserted within.

15. A system for facilitating the accurate transfer of information from each of a plurality of nonuniformly formatted source data streams into a structured database, said system comprising:

a communication interface for supplying from each of a plurality of user sites a source data stream containing data corresponding to multiple discernible source data strings;

a data extractor for extracting selected ones of said source data strings from said source data streams and generating related target data strings and for returning said target data strings to said user sites;

display apparatus for displaying a structured form comprised of multiple fields, each field capable of accommodating a data string and wherein one or more of said fields have said target data strings inserted within;

data entry apparatus for enabling each user to alter said fields of said form corresponding to said source data stream originating from said user before accepting said form; and a database for storing data corresponding to said data strings from said form fields.

16. The system of claim 15 wherein said communication interface uses the Internet.

17. The system of claim 15 wherein said display apparatus additionally displays said source data stream and said data entry apparatus enables said users to copy selected portions of said source data stream into selected fields of said form.

18. The system of claim 17 wherein said data extraction apparatus additionally returns said source data stream to its corresponding user.

19. The system of claim 15 wherein one or more of said target data strings are essentially equivalent to said extracted source data strings.

20. The system of claim 15 additionally comprising:

means for supplying one or more supplemental data strings in response to a supplemental inquiry form; and wherein said displayed structured form additionally displays fields having said supplemental data strings inserted within.

\* \* \* \* \*

(12) EX PARTE REEXAMINATION CERTIFICATE (5000th)
United States Patent
de Hilster et al.

(10) Number: US 5,999,939 C1
(45) Certificate Issued: Oct. 19, 2004

(54) SYSTEM AND METHOD FOR DISPLAYING AND ENTERING INTERACTIVELY MODIFIED STREAM DATA INTO A STRUCTURED FORM

(75) Inventors: David Scott de Hilster, Long Beach, CA (US); Alan George Porter, Huntington Beach, CA (US); John Reese, Los Angeles, CA (US)

(73) Assignee: Brassring LLC, Waltham, MA (US)

Reexamination Request:
No. 90/006,570, Mar. 24, 2003

Reexamination Certificate for:
Patent No.: 5,999,939
Issued: Dec. 7, 1999
Appl. No.: 09/019,948
Filed: Feb. 6, 1998

Related U.S. Application Data

(60) Provisional application No. 60/068,404, filed on Dec. 21, 1997.

(51) Int. Cl.[7] ......................... G06F 17/00; G06F 17/30
(52) U.S. Cl. ..................... 707/102; 707/104.1; 707/10
(58) Field of Search ............................ 707/102, 104.1, 707/10; 715/523, 505

(56) References Cited

U.S. PATENT DOCUMENTS

| | | | |
|---|---|---|---|
| 5,164,899 A | 11/1992 | Sobotka et al. | 364/419 |
| 5,832,497 A | 11/1998 | Taylor | 707/104 |
| 5,999,939 A | 12/1999 | de Hilster | 707/102 |
| 6,246,996 B1 * | 6/2001 | Stein et al. | 705/26 |

FOREIGN PATENT DOCUMENTS

WO   WO 95/24687 A1   9/1995

OTHER PUBLICATIONS

Noah, William W. and Rollin V. Weeks, "*TRW: Description of the Deft System as Used for MUC–5,*" pp. 237–248, 1993.

* cited by examiner

*Primary Examiner*—Uyen Le

(57) ABSTRACT

A system and method for facilitating the accurate entry of information into a highly structured database by initially extracting information from a plurality of nonuniformly formatted source data streams, e.g., documents/files, and subsequent interactions with users before storing the accepted and/or modified information into the database. Embodiments of the present invention provide an interactive path for each user (e.g., the author of the source document/file) to interactively modify the extracted data, e.g., according to the source document/file. Preferably, this interactive path is provided via the Internet and the extracted information can be modified by editing and/or selectively copying portions of the source documents/files to supplement and/or modify the extracted information.

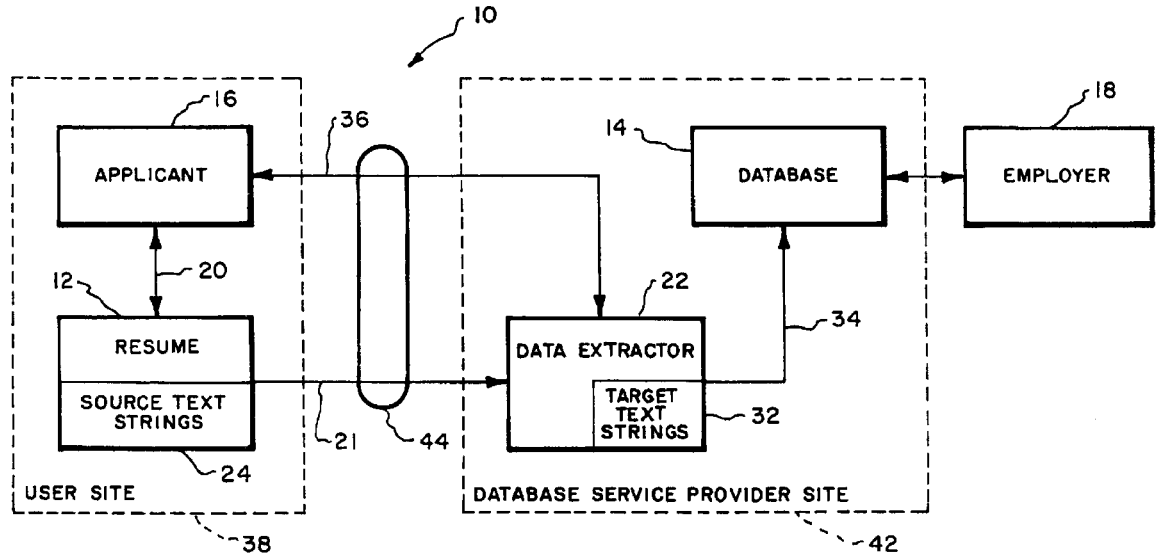

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–20 is confirmed.

\* \* \* \* \*